United States Patent
Ichikawa

(10) Patent No.: US 8,779,724 B2
(45) Date of Patent: Jul. 15, 2014

(54) RESIDENTIAL ELECTRIC POWER STORAGE SYSTEM

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 169 days.

(21) Appl. No.: 13/514,129

(22) PCT Filed: Dec. 28, 2009

(86) PCT No.: PCT/JP2009/071737
§ 371 (c)(1),
(2), (4) Date: Jun. 6, 2012

(87) PCT Pub. No.: WO2011/080810
PCT Pub. Date: Jul. 7, 2011

(65) Prior Publication Data
US 2012/0262124 A1  Oct. 18, 2012

(51) Int. Cl.
*H01M 10/46* (2006.01)
(52) U.S. Cl.
USPC ........................................................ 320/134
(58) Field of Classification Search
CPC .............. H02J 7/00; H02J 3/02; H02J 3/18; H02J 7/0008; H02J 7/0021; H02J 7/0031; H01M 10/44; H01M 10/46; G06F 1/26; G06F 1/263
USPC .......................... 320/109, 127, 128, 132, 134
See application file for complete search history.

(56) References Cited

U.S. PATENT DOCUMENTS

| | | | |
|---|---|---|---|
| 6,900,556 B2 | 5/2005 | Provanzana et al. | |
| 7,873,441 B2 | 1/2011 | Synesiou et al. | |
| 7,917,251 B2 | 3/2011 | Kressner et al. | |
| 2002/0123850 A1 | 9/2002 | Miyoshi et al. | |
| 2002/0128747 A1 | 9/2002 | Mima | |
| 2009/0157529 A1 | 6/2009 | Ehlers et al. | |
| 2009/0184689 A1* | 7/2009 | Kressner et al. | 320/162 |
| 2009/0192655 A1 | 7/2009 | Ichikawa et al. | |
| 2009/0195349 A1 | 8/2009 | Frader-Thompson et al. | |
| 2010/0141046 A1 | 6/2010 | Paik | |
| 2010/0293045 A1 | 11/2010 | Burns et al. | |
| 2010/0327800 A1* | 12/2010 | Reineccius | 320/101 |
| 2012/0019205 A1* | 1/2012 | Kressner et al. | 320/109 |

FOREIGN PATENT DOCUMENTS

| | | |
|---|---|---|
| EP | 1 156 573 A2 | 11/2001 |
| EP | 1 414 126 A1 | 4/2004 |
| EP | 1 156 573 A3 | 11/2004 |
| JP | A-5-292672 | 11/1993 |

(Continued)

OTHER PUBLICATIONS

Apr. 15, 2013 Office Action issued in U.S. Appl. No. 13/497,167.

(Continued)

*Primary Examiner* — Edward Tso
(74) *Attorney, Agent, or Firm* — Oliff PLC

(57) ABSTRACT

A controller includes a data accumulation unit that obtains data of an amount of electric power consumed in a residence and accumulates the obtained data a representative pattern creation unit that creates a representative pattern based on the data accumulated in the data accumulation unit, the pattern representatively indicating how the electric power storage device varies in state of charge for its discharging period and a limit value determination unit that determines a limit value to correspond to the pattern.

6 Claims, 5 Drawing Sheets

(56) References Cited

FOREIGN PATENT DOCUMENTS

| JP | A-5-292674 | 11/1993 |
|----|------------|---------|
| JP | A-7-312597 | 11/1995 |
| JP | A-8-141918 | 6/1996 |
| JP | A-8-331776 | 12/1996 |
| JP | A-9-223515 | 8/1997 |
| JP | A-11-41831 | 2/1999 |
| JP | A-11-46458 | 2/1999 |
| JP | A-11-136866 | 5/1999 |
| JP | A-11-178237 | 7/1999 |
| JP | A-2000-32669 | 1/2000 |
| JP | A-2001-8380 | 1/2001 |
| JP | A-2001-8385 | 1/2001 |
| JP | A-2002-171669 | 6/2002 |
| JP | A-2002-247761 | 8/2002 |
| JP | A-2002-262456 | 9/2002 |
| JP | A-2005-332040 | 12/2005 |
| JP | A-2006-109621 | 4/2006 |
| JP | A-2007-312597 | 11/2007 |
| JP | A-2008-54439 | 3/2008 |
| JP | A-2008-141918 | 6/2008 |
| WO | WO 2007/102757 A1 | 9/2007 |

OTHER PUBLICATIONS

Dec. 28, 2009 International Search Report issued in International Patent Application No. PCT/JP2009/067335 (With Translation).
Mar. 9, 2010 International Search Report issued in International Patent Application No. PCT/JP2009/071737 (With Translation).
U.S. Appl. No. 13/497,167 in the name of Ichikawa et al., filed Mar. 20, 2012.
Notice of Allowance issued in U.S. Appl. No. 13/497,167 dated May 9, 2014.

\* cited by examiner

RESIDENTIAL ELECTRIC POWER STORAGE SYSTEM

TECHNICAL FIELD

The present invention relates to a residential electric power storage system, and particularly to controlling an amount of electric power discharged from an electric power storage device.

BACKGROUND ART

While there is a smaller demand for electric power late at night than daytime, it is better to operate an electric power generator continuously, because doing so is more efficient. It is difficult to store generated electric power, and accordingly, electric power generation facilities have their capabilities set to generate electric power in accordance with a peak of demand for electric power. Under such a circumstance, it is well known that late-night power rate is lower than daytime power rate. It is desirable if households, companies, factories, and other electric power consumers can store midnight electric power in a reservoir type storage battery and use it in the daytime to achieve a reduced electricity bill and a leveled load.

Japanese Patent Laying-Open No. 2001-008380 (PTL 1) discloses a system allowing an electric vehicle and a residence to mutually transmit electric power and indicates leveling a demand for electric power.

CITATION LIST

Patent Literature

PTL 1: Japanese Patent Laying-Open No. 2001-008380
PTL 2: Japanese Patent Laying-Open No. 2007-312597
PTL 3: Japanese Patent Laying-Open No. 11-178237
PTL 4: Japanese Patent Laying-Open No. 5-292672
PTL 5: Japanese Patent Laying-Open No. 5-292674
PTL 6: Japanese Patent Laying-Open No. 8-331776
PTL 7: Japanese Patent Laying-Open No. 11-046458
PTL 8: Japanese Patent Laying-Open No. 11-136866

SUMMARY OF INVENTION

Technical Problem

In recent years, electric vehicles, hybrid vehicles, system interconnection type solar photovoltaic power generation systems and the like are widespread and accordingly, electric power storage devices such as various types of batteries are also increasingly reduced in cost, and households and other consumers of small capacity are now entering a stage to practically introduce an electric power storage device for leveled electric power.

However, it is still hard to say that electric power storage devices are inexpensive. Residential electric power storage system is used over a long period of time of 10 years or longer. Accordingly, however lower a late-night power rate may be than a daytime power rate, an electric power storage device having a short lifetime and hence being costly for replacement would cancel the economic advantage of the night power rate.

An electric power storage device varies in lifetime depending on how it is used.

FIG. 12 shows a relationship between a discharging current and an expected number of lifetime cycles.

With reference to FIG. 12, the axis of ordinate represents the expected number of lifetime cycles (in times), and the axis of abscissa represents a current (CA) discharged from an electric power storage device. CA is a value calculated by a charging current (A)/a battery's capacity (Ah), and for $CA=1$ it is a discharging current that would discharge the battery's entire capacity in 1 hour. As represented in FIG. 12, it can be seen that as the discharging current increases, the expected number of lifetime cycles decreases gradually. Accordingly, when the discharging current is increased indefinitely the electric power storage device's lifetime would be shortened. Japanese Patent Laying-Open No. 2001-008380 does not discuss an electric power storage device's lifetime.

An object of the present invention is to provide a residential electric power storage system that can determine a limit value for an amount of electric power discharged that is suitable for each residence equipped therewith, with an electric power storage device's lifetime considered,

Solution to Problem

In summary, the present invention provides a residential electric power storage system including: an electric power storage device configured to be capable of supplying a residence with electric power; an electric power restriction unit following a limit value to restrict an amount of electric power discharged from the electric power storage device to the residence; and a controller that determines the limit value and also controls the electric power restriction unit. The controller includes: a data accumulation unit that obtains data of an amount of electric power consumed in the residence and accumulates the obtained data; a representative pattern creation unit that creates a representative pattern based on the data accumulated in the data accumulation unit, the representative pattern representatively indicating how the electric power storage device varies in state of charge for its discharging period; and a limit value determination unit that determines the limit value to correspond to the pattern.

Preferably, the representative pattern creation unit creates a plurality of patterns. The limit value determination unit determines a plurality of limit values corresponding to the plurality of patterns, respectively. The controller further includes a plan creation unit to select any of the patterns based on selection information and obtain a limit value that corresponds to the selected pattern from the limit value determination unit to create a plan to indicate how a target value for the state of charge of the electric power storage device transitions for the discharging period.

More preferably, the plan creation unit creates the plan to cause the electric power storage device to discharge within the discharging period an amount of electric power charged to and thus stored in the electric power storage device beyond a lower limit value set for the state of charge of the electric power storage device.

More preferably, the controller further includes: a comparison unit that makes a comparison of the plan with an actual transition of the state of charge of the electric power storage device varying with an amount of electric power actually consumed in the residence; and a correction unit that corrects the plan in accordance with a result of the comparison made by the comparison unit.

Preferably, the electric power storage device is configured to be capable of receiving electric power from a commercial power supply system and storing the received electric power therein, and the electric power storage device has a charging period for which a lower power rate is set than that for the discharging period.

Advantageous Effects of Invention

The present invention can thus provide a residential electric power storage system allowing a residence equipped therewith to have an electric power storage device electrically discharging suitably to the residence and therefore the lifetime of the power storage device increases.

DESCRIPTION OF EMBODIMENTS

Hereinafter reference will be made to the drawings to describe the present invention in embodiments. In the figures, identical or corresponding components are identically denoted, and will thus not be described repeatedly.

Figure 1:
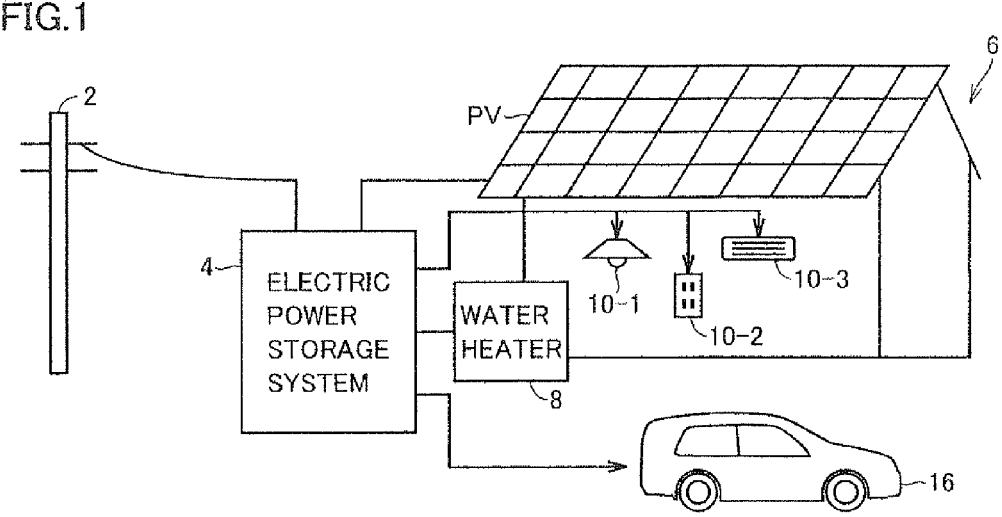
FIG. 1 is a diagram for outlining a residential electric power storage system.

FIG. 1 is a diagram for outlining a residential electric power storage system.

With reference to FIG. 1, an electric power storage system 4 is installed in a residence 6. Electric power storage system 4 has connected thereto a commercial power supply 2, a solar battery PV, a household electrical load 10 (including illumination 10-1, a plug outlet 10-2, an air conditioner 10-3, and the like), an electric water heater 8, and a vehicle 16. Vehicle 16 is a plug-in hybrid vehicle having an externally electrically chargeable battery or the like mounted therein. Note that vehicle 16 may be an electric vehicle or a fuel cell powered vehicle, for example.

Figure 2:
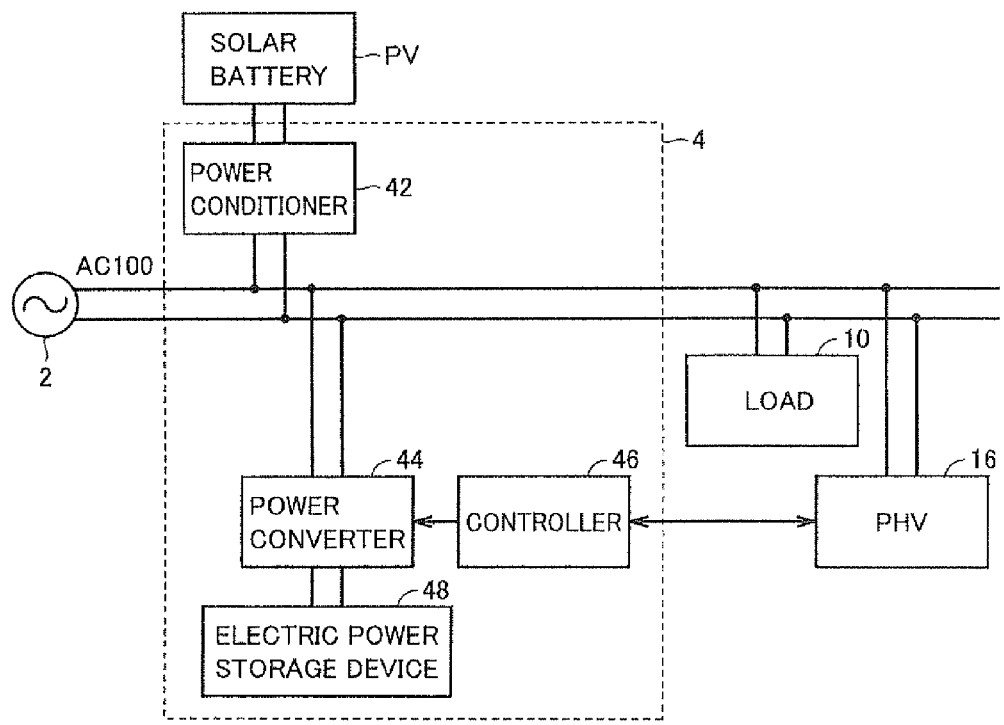
FIG. 2 is a block diagram for illustrating a configuration of an electric power storage system 4.

FIG. 2 is a block diagram for illustrating a configuration of electric power storage system 4.

Referring to FIG. 1 and FIG. 2, electric power storage system 4 includes an electric power storage device 48 configured to be capable of supplying residence 6 with electric power, a power converter 44 following a limit value to restrict an amount of electric power discharged from electric power storage device 48 to the residence, and a controller 46 that determines the limit value and also controls power converter 44.

Electric power storage system 4 may further include a power conditioner 42. Power conditioner 42 is provided indoors aside from a solar photovoltaic power generation panel installed on a roof having solar battery PV mounted thereon. Power conditioner 42 is employed for a typical solar photovoltaic power generation system, and converts direct current electric power that is extracted from the solar battery into alternating current electric power.

Figure 3:
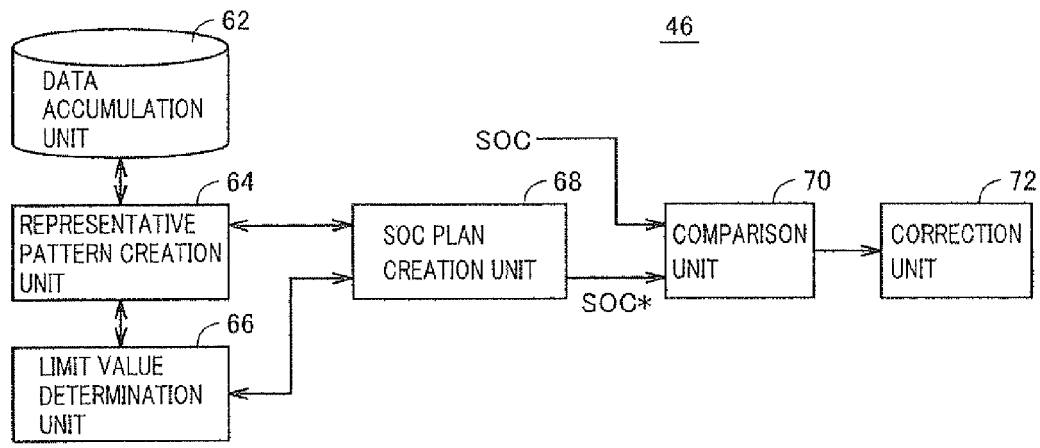
FIG. 3 is a functional block diagram representing in detail a controller 46 shown in FIG. 2.

FIG. 3 is a functional block diagram representing controller 46 shown in FIG. 2 in detail. Note that controller 46 can be implemented by software or hardware.

Referring to FIG. 2 and FIG. 3, controller 46 includes a data accumulation unit 62 which obtains data of an amount of electric power consumed in residence 6 and accumulates the obtained data, a representative pattern creation unit 64 which creates a representative pattern based on the data accumulated in data accumulation unit 62 to indicate how electric power storage device 48 for its discharging period varies in state of charge, and a limit value determination unit 66 which determines a limit value to correspond to the pattern.

Representative pattern creation unit 64 creates a plurality of patterns. Limit value determination unit 66 determines a plurality of limit values corresponding to the plurality of patterns, respectively. Controller 46 further includes an SOC plan creation unit 68 to select any of the patterns based on selection information, e.g., dates, the days of the week, seasons, and the like, and obtain a limit value that corresponds to the selected pattern from limit value determination unit 66 to create a plan indicating how a target value SOC* for the state of charge of electric power storage device 48 transitions for the discharging period.

SOC plan creation unit 68 creates the plan to cause electric power storage device 48 to discharge within the discharging period an amount of electric power charged to and thus stored in electric power storage device 48 beyond a lower limit value set for the state of charge SOC of electric power storage device 48. The discharging period is for example from 9:00 a.m. to 17:00 p.m.

Controller 46 further includes a comparison unit 70 which compares target value SOC* on the SOC plan with an actual transition in the state of charge SOC of electric power storage device 48 that varies with an amount of electric power actually consumed in the residence, and a correction unit 72 which corrects the SOC plan in accordance with a result of the comparison done by comparison unit 70.

Electric power storage device 48 is configured to be capable of receiving electric power of AC 100V or 200V (the voltage may vary from country to country) from commercial power supply system 2 and storing the received electric power therein. Electric power storage device 48 has a charging period for which a lower power rate is set than that for the discharging period. The charging period can be a late-night power rate period determined by the electric power company concerned, for example.

Controller 46 thus described in FIG. 3 can also be implemented through software using a computer. The computer may be of a typical configuration, and it is configured for example including a CPU, an A/D converter, a ROM, a RAM, an interface unit, and the like.

The interface unit for example communicates with another ECU, inputs data to be rewritten when an electrically rewritable flash memory or the like is used as a ROM, reads a data signal from a memory card, a CD-ROM and/or a computer readable storage medium, and the like.

Note that controller 46 is not limited to such a configuration and may be implemented including a plurality of CPUs.

Figure 4:
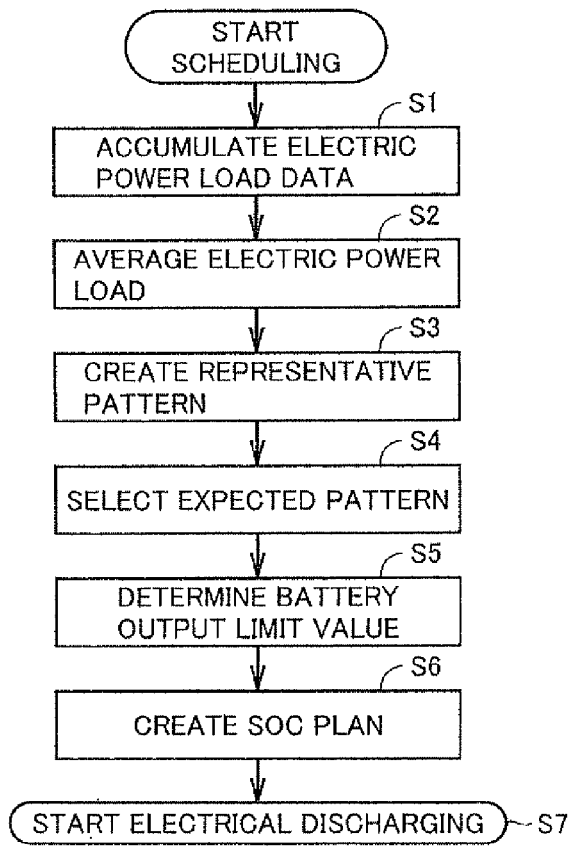
FIG. 4 is a flowchart representing a structure to control a process performed by controller 46.

FIG. 4 is a flowchart representing a structure to control a process performed by controller 46.

With reference to FIG. 4, initially at Step S1, electric power load data is stored. When electric power storage system 4 is installed in a residence, electric power storage device 48 is initially electrically charged and discharged based on a standard plan. After the installation, the electric power consumed in the residence is monitored for some period of time and accumulated as electric power load data.

Figure 5:
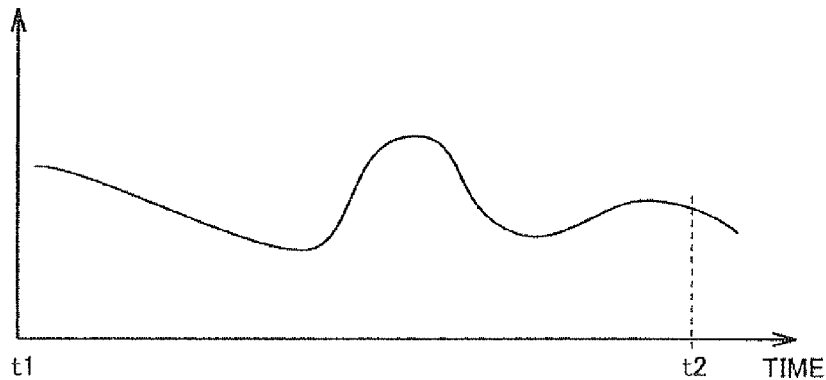
FIG. 5 is a diagram representing an example of electric power load data accumulated.

FIG. 5 is a diagram representing an example of the electric power load data accumulated.

With reference to FIG. 5, time t1 is a time to start discharging and can for example be 9:00 a.m. Time t2 is a time to end discharging and can for example be 5:00 p.m. The data of such power load (or power consumption) of the residence is accumulated over several days to several months.

The data is classified into several types of patterns according to a clustering which classifies given data automatically without an external criterion. In the clustering, a set of data is divided into subsets (or clusters) having data sharing a common feature.

Then, at Step S2, each classified set is averaged, and at Step S3, a single representative pattern is created for each classified set.

Figure 6:
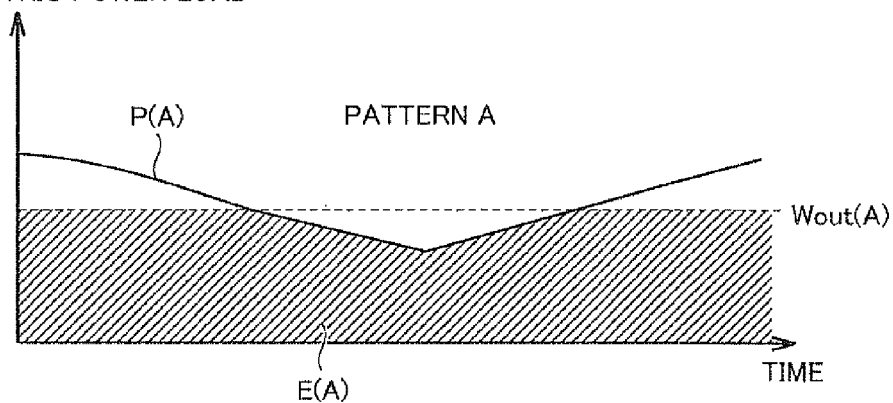
FIG. 6 is a diagram representing a representative pattern in a first example (a pattern A).

FIG. 6 is a diagram representing a representative pattern in a first example (a pattern A).

Figure 7:
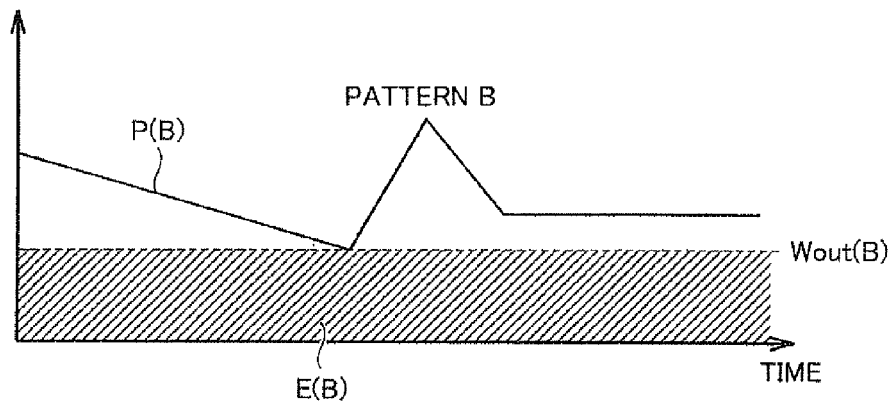
FIG. 7 is a diagram representing a representative pattern in a second example (a pattern B).

FIG. 7 is a diagram representing a representative pattern in a second example (a pattern B).

The FIG. 6 pattern A is a pattern corresponding to a weekday, for example. The FIG. 7 pattern B is a pattern corresponding to a holiday, for example. When patterns A and B are compared, it can be seen that a larger number of people are at home on the holiday and accordingly, more electric power is consumed. Note that the classification may be done based not only on weekday/holiday but may further be subdivided with seasons, the days of the week and the like considered.

Referring again to FIG. 4, once Step S3, or creating a representative pattern, has been completed, Step S4 is then performed to select an expected pattern. The expected pattern can be selected for example by determining, for example by a date, to which class the current discharging pattern belongs, and a corresponding representative pattern can thus be selected.

Then, a battery output limit value Wout is determined at Step S5. In FIG. 6, an electric power output limit value Wout (A) is set for an electric power load pattern P(A). In that case, the electric power storage device discharges an amount of electric power indicated by a hatched area E(A). Furthermore, in FIG. 7, an electric power output limit value Wout(B) is set for an electric power load pattern P(B). In that case, the electric power storage device discharges an amount of electric power indicated by a hatched area E(B).

Electric power output limit value Wout is determined such that hatched areas E(A) and E(B) are substantially equal to a capacity that electric power storage device 48 can electrically discharge as a battery. In FIG. 6, P(A)>Wout(A) is a portion which does not belong to area E(A) and is accommodated by electric power received from commercial power supply 2 and solar battery PV, rather than electric power discharged from electric power storage device 48. Furthermore, for the portion of Wout(A)>P(A), electric power storage device 48 will discharge electric power of P(A). FIG. 7 can similarly be discussed.

Figure 12:
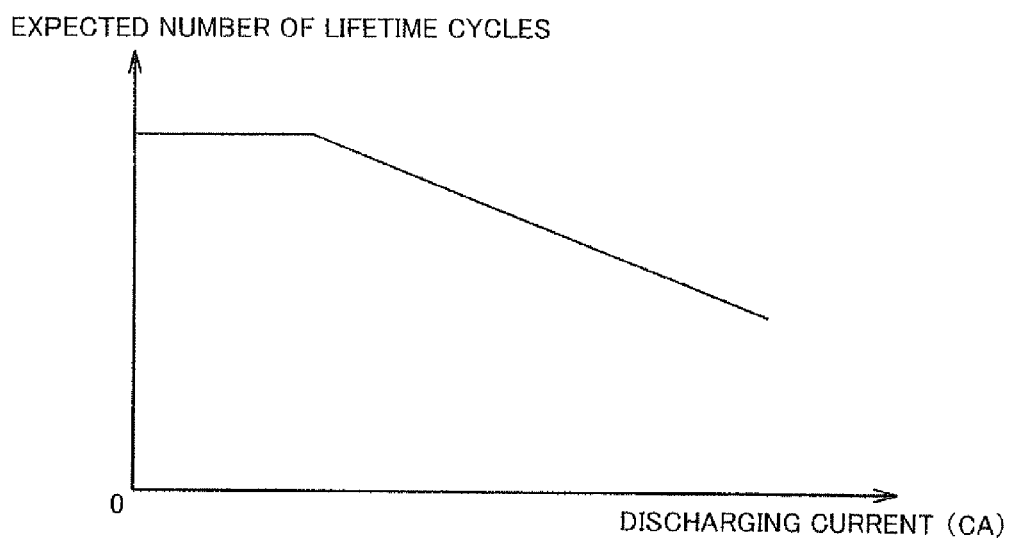
FIG. 12 shows a relationship between a discharging current and an expected number of lifetime cycles.

Then, at Step S6, an SOC plan is created. The SOC plan is to previously determine how the state of charge (SOC) of electric power storage device 48 varies. Controlling an amount of electric power discharged from electric power storage device 48 to have an SOC varying as determined in the SOC plan can prevent electric power storage device 48 from excessively electrically discharging (or attaining a peak value) and having its lifetime negatively affected, and thus allows the residence of interest to have electric power storage device 48 maximized in lifetime. This is because discharging a large current for a longer period of time reduces a battery's lifetime more, as shown in FIG. 12.

Figure 8:
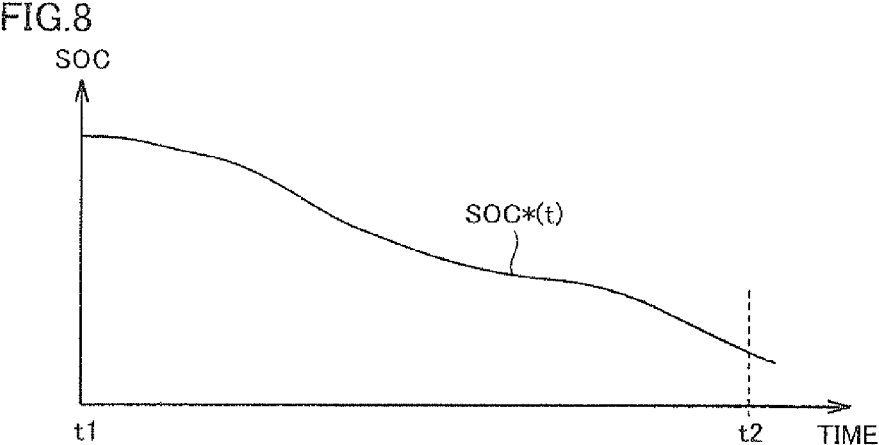
FIG. 8 is a diagram representing an example of an SOC plan.

FIG. 8 is a diagram representing an example of the SOC plan.

FIG. 8 shows an example of the SOC plan that corresponds to the FIG. 6 pattern A. Target SOC value SOC*(t) is calculated as a fully charged state minus the hatched area of FIG. 6 by subtracting the area from target value SOC* that is obtained before a time elapses whenever the time elapses.

Then in FIG. 4 at step S6 an SOC plan is created, and thereafter when the time to start discharging t1 is reached, Step S7 is performed to cause electric power storage device 48 to electrically discharge.

However, electric power storage device 48 may not electrically discharge as indicated by a representative pattern. Target SOC value SOC*(t) may deviate from how the actual SOC varies. In that case, the SOC plan is modified in the same day to control electric power storage device 48 to discharge an amount of electric power that is appropriate for that day.

Figure 9:
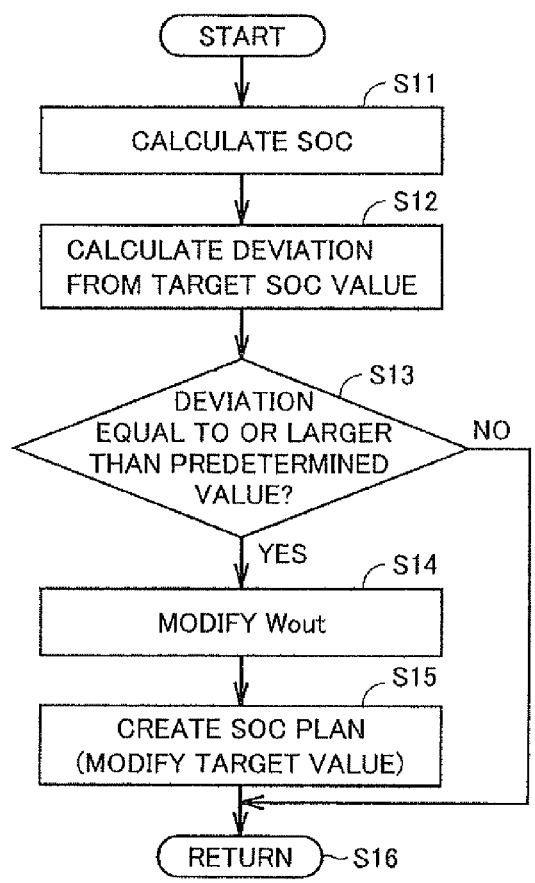
FIG. 9 is a flowchart for illustrating how modifying the SOC plan is controlled.

FIG. 9 is a flowchart for illustrating how modifying the SOC plan is controlled.

With reference to FIG. 9, initially at Step S11, the current SOC is calculated. Calculating the SOC may be done by accumulating a current, estimating the battery's open circuit voltage based on a current and a voltage, or a similar known method, and accordingly, it will not be described in detail.

Then, Step S12 is performed to calculate how the SOC(t) calculated at Step S11 deviates from a target SOC value SOC(t) corresponding to the current time t.

Figure 10:
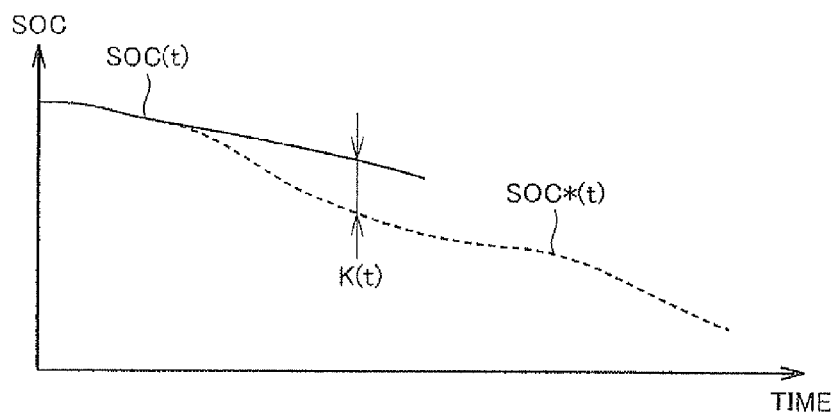
FIG. 10 is a diagram for illustrating a deviation of SOC(t) from SOC*(t).

FIG. 10 is a diagram for illustrating a deviation of SOC(t) from SOC*(t).

As shown in FIG. 10, the amount of the deviation K(t) is calculated as |SOC(t)−SOC*(t)|. FIG. 10 shows a case in which an amount of electric power consumed before time 1 is smaller than expected and SOC(t) has thus not so decreased. In that case, if the electric power storage device does not discharge an amount of electric power larger than planned by the time to end discharging t2, it will fail to completely use the electric power accumulated in the nighttime and thus have electric power remaining therein. Accordingly in such a case the battery's output limit value Wout is increased and the SOC plan is also re-created to finally match SOC*(t) as originally planned.

Referring again to FIG. 9, once the amount of the deviation K(t) has been calculated at Step S12, then Step S13 is performed to determine whether the amount of the deviation K(t) is equal to or greater than a predetermined amount, which is set as a threshold value A.

If in Step S13 K(t)≥A, then the control proceeds to Step S14. In that case, limit value Wout is modified based on the following expression:

$$Wout(t+1)=Wout(t)+(SOC(t)-SOC^*(t))\times\alpha(t),$$

where α(t) is a weighting factor.

Figure 11:
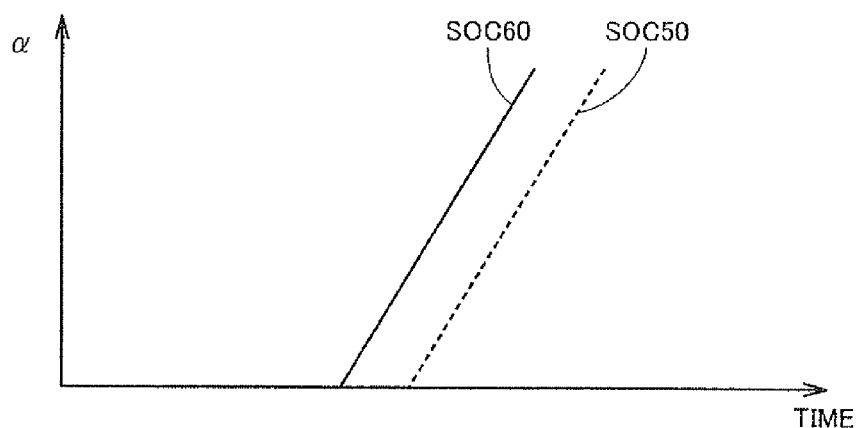
FIG. 11 is a diagram for illustrating a weighting factor $\alpha$.

FIG. 11 is a diagram for illustrating weighting factor α.

With reference to FIG. 11, weighting factor α(t) is a function of time and is also a function set with SOC as a parameter. SOC 60 shows a case with a larger amount of deviation than SOC 50. If the amount of deviation is the same, as the end time (e.g., 17 p.m.) of discharging is approaching, it will fail to completely use the electric power that has been charged in the nighttime by the end time without discharging a larger amount of electric power from electric power storage device 48. This is because α(t) increases as time elapses.

Furthermore, weighting factor α is increased for larger amounts of deviation because failing to discharge larger amounts of electric power for larger amounts of deviation will result in failing to completely use the electric power that has been charged in the nighttime by the time to end discharging.

Then in FIG. 9 at step S15 an SOC plan is created for how the actual SOC(t) is matched to the line of target value SOC*(t) as originally planned. At the time, target value SOC* after time t is modified. For example the modification is done based on the following expression:

$$SOC*(t)=SOC-\int W_{out}dt.$$

That is, target value SOC*(t) is recalculated, assuming that the electric power storage device continues to electrically discharge from the current SOC with the modified limit value Wout until the time to end discharging is reached. Then, the control proceeds to Step S16 and returns to a main routine.

In contrast, if at Step S13 the amount of the deviation K(t) is not equal to or greater than the threshold value, Steps S14 and S15 are not performed, and the control proceeds to Step S16 and returns to the main routine. In that case, the SOC plan and limit value Wout as before are continuously used.

Thus in the present embodiment output limit value Wout is set to be as small as possible and electrically discharging the electric power storage device is thus started. Then, if the electric power having been stored in the nighttime cannot completely be used by the time to end discharging in accordance with how the SOC actually varies, output limit value Wout is temporarily increased to completely use the stored electric power. This prevents the electric power storage device from degrading and also allows stored electric power to be used as completely as possible.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

REFERENCE SIGNS LIST

4: electric power storage system, 8: water heater, 10: household electrical load, 10-3: air conditioner, 10-2: electric socket, 10-1: illumination, 16: vehicle, 42: power conditioner, 44: power converter, 46: controller, 48: electric power storage device, 62: data accumulation unit, 64: representative pattern creation unit, 66: limit value determination unit, 68: SOC plan creation unit, 70: comparison unit, 72: correction unit, PV: solar battery.

The invention claimed is:

1. A residential electric power storage system comprising:
an electric power storage device configured to be capable of supplying a residence with electric power;
an electric power restriction unit following a limit value to restrict an amount of electric power discharged from said electric power storage device to the residence; and
a controller that determines said limit value and also controls said electric power restriction unit, said controller including a data accumulation unit that obtains data of an amount of electric power consumed in the residence and accumulates said data obtained,
a representative pattern creation unit that creates a representative pattern based on said data accumulated in said data accumulation unit, said representative pattern representatively indicating said amount of electric power consumed in the residence for a discharging period of said electric power storage device, and
a limit value determination unit that determines said limit value so that an accumulated value for said discharging period of a smaller one of electric power determined by said pattern and electric power determined by said limit value has a value equal to a capacity that said electric power storage device can electrically discharge.

2. The residential electric power storage system according to claim 1, wherein:
said representative pattern creation unit creates a plurality of patterns;
said limit value determination unit determines a plurality of limit values corresponding to said plurality of patterns, respectively; and
said controller further includes a plan creation unit to select any of said patterns based on selection information and obtain from said limit value determination unit a limit value that corresponds to the selected pattern to create a plan to indicate how a target value for the state of charge of said electric power storage device transitions for said discharging period.

3. The residential electric power storage system according to claim 2, wherein said plan creation unit creates said plan to cause said electric power storage device to discharge within said discharging period an amount of electric power charged to and thus stored in said electric power storage device beyond a lower limit value set for the state of charge of said electric power storage device.

4. The residential electric power storage system according to claim 2, wherein said controller further includes:
a comparison unit that makes a comparison of said plan with an actual transition of the state of charge of said electric power storage device varying with an amount of electric power actually consumed in the residence; and
a correction unit that corrects said plan in accordance with a result of said comparison made by said comparison unit.

5. The residential electric power storage system according to claim 1, wherein:
said electric power storage device is configured to be capable of receiving electric power from a commercial power supply system and storing the received electric power therein; and
said electric power storage device has a charging period for which a lower power rate is set than that for said discharging period.

6. The residential electric power storage system according to claim 3, wherein said controller further includes:
a comparison unit that makes a comparison of said plan with an actual transition of the state of charge of said electric power storage device varying with an amount of electric power actually consumed in the residence; and
a correction unit that corrects said plan in accordance with a result of said comparison made by said comparison unit.

* * * * *